United States Patent
Lintu

(10) Patent No.: US 12,122,499 B2
(45) Date of Patent: Oct. 22, 2024

(54) VARIABLE SHAPE AIRSHIP

(71) Applicant: KELLUU OY, Reijola (FI)

(72) Inventor: Jouni Lintu, Joensuu (FI)

(73) Assignee: KELLUU OY, Reijola (FI)

( * ) Notice: Subject to any disclaimer, the term of this patent is extended or adjusted under 35 U.S.C. 154(b) by 51 days.

(21) Appl. No.: 17/434,219

(22) PCT Filed: Feb. 21, 2020

(86) PCT No.: PCT/FI2020/050112
§ 371 (c)(1),
(2) Date: Aug. 26, 2021

(87) PCT Pub. No.: WO2020/174125
PCT Pub. Date: Sep. 3, 2020

(65) Prior Publication Data
US 2022/0135198 A1    May 5, 2022

(30) Foreign Application Priority Data
Feb. 26, 2019    (FI) ..................... 20195145

(51) Int. Cl.
*B64B 1/04* (2006.01)
*B64B 1/62* (2006.01)
(Continued)

(52) U.S. Cl.
CPC .............. *B64B 1/62* (2013.01); *B64B 1/04* (2013.01); *B64C 39/024* (2013.01); *B64U 10/30* (2023.01)

(58) Field of Classification Search
CPC .............. B64B 1/04; B64B 1/62; B64U 10/30
See application file for complete search history.

(56) References Cited

U.S. PATENT DOCUMENTS 6,648,272 B1 * 11/2003 Kothmann ............... B64B 1/58
244/30
7,261,255 B2    8/2007 Li
(Continued)

FOREIGN PATENT DOCUMENTS

FR    2927307    8/2009

OTHER PUBLICATIONS

International Search Report for PCT/FI2020/050112, mailed May 28, 2020, 3 pages.
(Continued)

*Primary Examiner* — Tye William Abell
(74) *Attorney, Agent, or Firm* — NIXON & VANDERHYE

(57) ABSTRACT

Disclosed is a method for controlling an elongated lighter-than-air aircraft formed of a thin shell. The method includes providing a first stiffener on the outer surface of the shell of the aircraft on a first side of a gas tank, and a second stiffener on the outer surface of the shell of the aircraft on a second side of the gas tank, fitting control members with adjustable length through the shell of the aircraft in a gas tank space defined by the inner surface of the shell so the control members extend between the first and second stiffener, adjusting the distance between the first stiffener and the second stiffener when controlling the aircraft by means of the control members by moving the first stiffener and second stiffener in a first and a second direction opposite to each other. Further, disclosed is an aircraft.

8 Claims, 3 Drawing Sheets

(51) Int. Cl.
 *B64C 39/02* (2023.01)
 *B64U 10/30* (2023.01)

(56) References Cited

U.S. PATENT DOCUMENTS

| | | | | |
|---|---|---|---|---|
| 2007/0034740 A1* | 2/2007 | Li | ............................ | B64B 1/58 |
| | | | | 244/30 |
| 2014/0061370 A1* | 3/2014 | Vojtech | .................... | B64B 1/06 |
| | | | | 244/30 |
| 2017/0129579 A1* | 5/2017 | de Jong | .................... | B64B 1/44 |

OTHER PUBLICATIONS

Written Opinion of the ISA for PCT/FI2020/050112, mailed May 28, 2020, 10 pages.
Search Report for FI20195145, dated Oct. 1, 2019, 1 page.
Communication pursuant to Article 94(3) EPC issued in European Patent Application No. 20 717 239.6 dated Apr. 3, 2023.
Office Action, issued in European Patent Application No. 20717239.6 dated Jun. 7, 2024.

* cited by examiner

VARIABLE SHAPE AIRSHIP

This application is the U.S. national phase of International Application No. PCT/FI2020/050112 filed 21 Feb. 2020, which designated the U.S. and claims priority to FI Patent application No. 20195145 filed 26 Feb. 2019, the entire contents of each of which are hereby incorporated by reference.

FIELD OF TECHNOLOGY

The object of the invention is an aircraft using a lighter-than-air gas as lifting gas and a method related thereto.

BACKGROUND OF THE INVENTION

Controllable crafts floating in air often contain a gas tank formed of a flexible shell for housing lifting gas, such as helium or hydrogen. Due to the flexible shell, in controllable aircrafts with no separate internal rigid support structure, such as non-rigid frame aircrafts, for example so-called blimps, the external shape of the aircraft is defined by the pressure created by the lifting gas used therein. Excess pressure within the aircraft thereby pushes the aircraft shell outward thus enabling maintaining the external shape of the aircraft.

Gas leakage is one of the problems associated with the above-described aircrafts. When enough lifting gas leaks from the gas tank to the outside of the aircraft, emptying may cause the external shape of the aircraft to bend or twist uncontrollably. If the leak cannot be compensated for, the change in the aircraft pressurization and the resulting contortion of the external shape may affect the function of the aircraft negatively, for example by increasing the drag coefficient and the energy consumption of the aircraft and slowing down the flying speed of the craft. Gas leakage may result in the aircraft being more difficult to control than normal in unusual weather conditions, for example in currents or winds that are stronger than usual.

To compensate for air leakage, there are one or more air bags inside the aircraft, so-called ballonets, for adjusting the buoyancy of the aircraft and for maintaining excess pressure inside the aircraft. In addition to ballonets, the aircraft has a ballast system containing, for example, water, for compensating the loss of aircraft buoyancy when using ballonets. Maintaining the pressurization is carried out using these by adding air to the ballonets inside the gas tank while the ballast of the aircraft is reduced, whereby the aircraft is able to maintain its flying altitude despite the addition of air that is heavier than the lifting gas. However, the drawback of the above-described implementation is that the presence of ballonets, compressors and a ballast system renders the aircraft heavy and large as well as slow, which limits the maneuverability and reliability of the aircrafts in strong winds.

No suitable technical implementations for solving the above-described problems are currently available. Examples of previously known methods are described in the patent publication FR 2927307 A1.

SUMMARY OF INVENTION

The aim of the present invention is to solve the above-mentioned problems and to provide an aircraft that is structurally simpler than known aircrafts.

Further, the aim of the present invention is to provide an aircraft with easy controllability.

Further, the aim of the invention is to provide an aircraft changing its aerodynamic external shape in a controlled manner.

Further, the aim of the present invention is to provide a novel and innovative method for controlling an aircraft.

These objectives are achieved with the aircraft and the method presented in the accompanying independent claims. Preferred embodiments of the invention have been presented in the dependent claims.

The aircraft of the present invention is formed of a thin shell, the inner surface of which defines a space for a gas tank that can be filled with a lighter-than-air gas, and the outer surface of which defines the external shape of the aircraft. The aircraft has a control arrangement changing the external shape of the aircraft for controlling the aircraft, which control arrangement comprises
- at least one first stiffener provided on the outer surface of the shell on a first side of the gas tank
- at least one second stiffener provided on the outer surface of the shell on a second side of the gas tank;
- at least one control member with adjustable length extending between at least one first stiffener and at least one second stiffener through the aircraft shell in the space defined by the inner surface of the shell, and via which control member at least one first stiffener and at least one second stiffener have been adapted to be movable in a first and a second direction opposite to each other.

In the method of the present invention for controlling an aircraft of the invention,
- at least one first stiffener is provided on the outer surface of the aircraft shell and at least one second stiffener on the outer surface of the aircraft shell on a second side of the gas tank;
- at least one control member with adjustable length is fitted through the aircraft shell in a gas tank space defined by the inner surface of the shell in such a way that said control member extends between at least one stiffener and at least one second stiffener,
- the distance between at least one first stiffener and at least one second stiffener is adjusted by moving said at least one stiffener and at least one second stiffener in a first and second direction opposite to each other.

The solution of the invention enables maintaining the external shape of the aircraft rigid in a controlled manner and easier to control than known solutions. Further, the solution of the present invention eliminates the need for the use of ballonets and compressors in aircrafts. The solution of the present invention thus enables aircrafts to be built light and small in size.

BRIEF DESCRIPTION OF DRAWINGS

Next, the invention is described in more detail with reference to the accompanying drawings, in which:

FIG. 1A shows a side view of an aircraft according to an embodiment of the present invention;

DETAILED DESCRIPTION OF INVENTION

Figure 1:
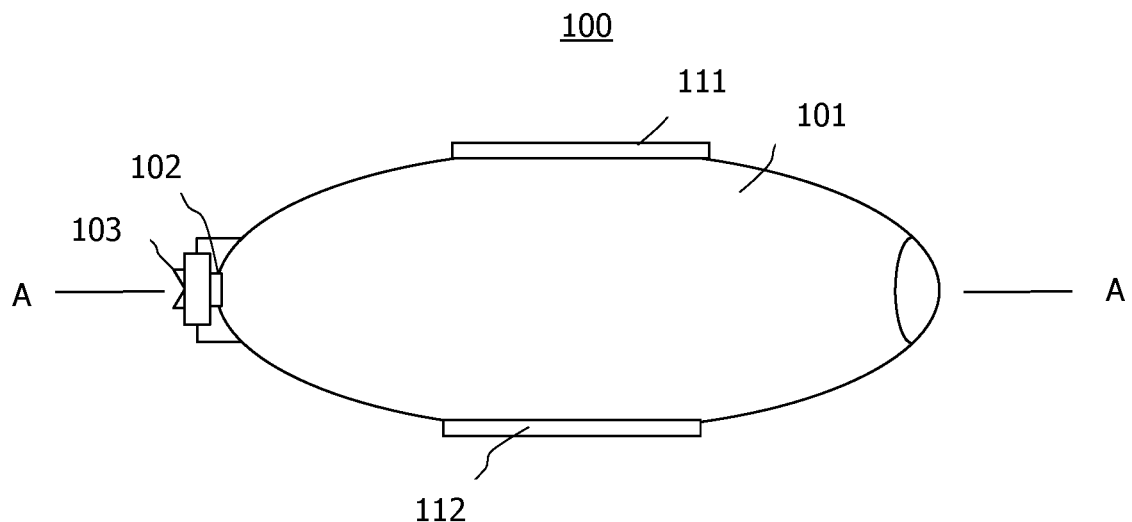
FIG. 1 B shows a front view of an aircraft according to an embodiment of the present invention.
Figure 1:
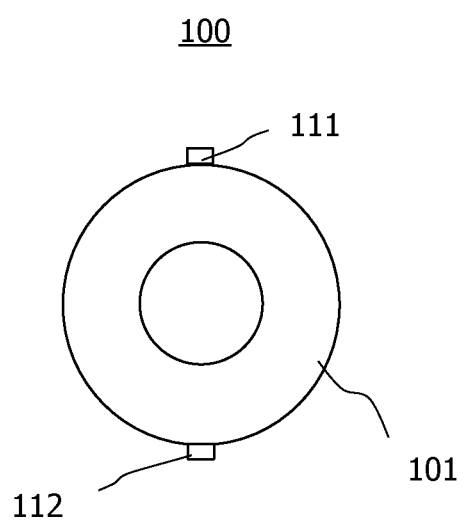

FIGS. 1 A and 1 B show an aircraft according to an embodiment of the present invention from different angles of view. FIGS. 1 A and 1 B show an aircraft that is unmanned and preferably moves independently. When viewed from the side, the aircraft 100 has an oval and elongated shape, and when viewed from the front, it has a round shape. The aircraft 100 is formed of a thin flexible shell in such a way that the outer surface of the shell defines the external shape of the aircraft 100. The inner surface of the shell defines a space for a gas tank 101 inside the aircraft 100. The gas tank 101 has been arranged in such a way that it can be filled with a lighter-than-air gas, such as helium or hydrogen, and closed with valves to prevent the gas from exiting. The shell may preferably be prepared, for example, from a plastic composite comprising polyamide (PA), ethyl vinyl alcohol and polyethylene (PE), rendering the shell durable and light. Other materials can also be used. The dimensions of the aircraft 100 when filled with gas are approximately 5 m×1 m×1 m (length×width×height), but the size is not limited to these dimensions and its external shape may vary.

In the back of the aircraft, there is a motor 102 assisting in the maneuvering of the aircraft and a propeller 103 rotated by the engine 102 in order to produce propulsive force. The aircraft further contains sensors, for example a pressure sensor, for measuring the gas pressure. The motor 102 and the propeller 103 receive the electrical energy necessary for their function from an energy reserve (not shown in the Figures) located in the aircraft 100, for example from a lithium polymer battery or a fuel cell.

On the outer surface of the shell, between the front and the back of the aircraft, in the middle section of the aircraft, there are at least two elongated stiffeners, of which the first stiffener 111 is in the top section of the aircraft 100, above the gas tank 101, and the second stiffener 112 is in the bottom section of the aircraft, opposite the first stiffener, below the gas tank 101. The stiffeners 111, 112 have been connected to each other via control members with adjustable length, of which there can be one or more, that have been provided through the inside of the gas tank 101. The control arrangement has been shown in more detail in FIG. 2.

Figure 2:
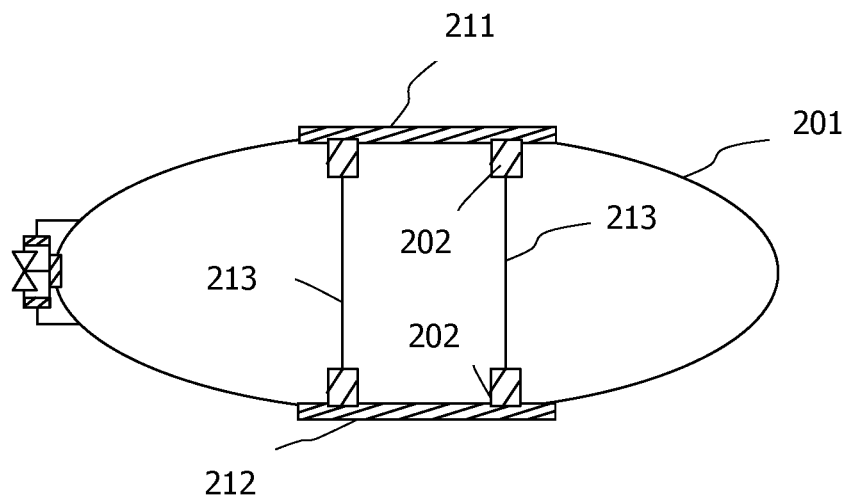
FIG. 2 shows a side view of the cross-section of an aircraft according to an embodiment of the present invention.

FIG. 2 shows a side view in the direction of the line A-A as shown in FIG. 1 A of the cross-section of an aircraft according to an embodiment of the present invention. The aircraft has a control arrangement comprising at least one elongated first stiffener 211 provided on the outer surface of the shell above the gas tank 201. The control arrangement further comprises at least one second stiffener 212 having the same dimensions as the first stiffener 211 provided on the outer surface of the shell below the gas tank 201, opposite the first stiffener. The stiffeners 211, 212 extend lengthwise in the direction of the longitudinal axis of the aircraft, presented in FIG. 1 A in the direction of the line A-A. The stiffeners 211, 212 have been fitted along the outer surface of the aircraft shell and positioned in the middle section of the aircraft, preferably at the center of buoyancy, between the front and the back of the aircraft. The length of the middle section can herein be limited to, by way of example, an area defined by the length of the stiffeners on the outer surface of the aircraft, as shown in FIG. 2. The center of buoyancy in this example is preferably at a level at which the aircraft is symmetrical, and in this case, it can be at the same point as the centroid of the aircraft.

The stiffeners 211, 212 have an elongated and plate-like shape, and they can be made from a rigid inflexible material, for example metal, such as aluminum or steel. Alternatively, the stiffener can be made from a flexible material that is easier to bend than a rigid material, such as wood, plastic or rubber. For example, plywood. By combining flexible and rigid material, it is possible to create other alternative stiffeners, for example in such a way at least one portion of such a stiffener is prepared from a more flexible material or a more rigid material. For example, combining metal and rubber, or wood and rubber is possible. Further, the stiffener can be provided by combining different materials and their shapes, for example the cross-section geometries thereof. In this case, the stiffener can have a plate-like or capsular shape, for example a square, oval or circular cross-section, enabling rendering the stiffener lighter. Carbon fibers, composites prepared from carbon fibers and plastics or composites prepared from carbon fibers and resins can also be used as materials for the stiffeners.

The stiffeners 211, 212 are effective in limiting the movement of the shell of the aircraft gas tank when the gas pressure changes and the control arrangement is being used, maintaining the aircraft rigid and controllable, but they 211, 212 may have a compressing effect on the shell, effectively preventing gas leakage from the aircraft. Preferably, the stiffeners 211, 212 have been designed to have high tensile strength in order to resist tearing of the stiffener during the use of the stiffeners. Thus, their position on the outer surface of the gas tank, rather than on the inner surface, enables preventing tearing of the shell material in addition to effectively limiting movement of the shell.

The control arrangement further has one or more control members 213 with adjustable length, extending between the first stiffener 211 and the second stiffener 212, continuing through the inside of the gas tank 201. The control members 213 limit the distance between the stiffeners 211, 212 in the lengthwise direction of the control members proportionally to the change in the control member length, and thus enable maintaining the aircraft shell rigid. For example, a spring, a cable, a rail, a rubber band, a threaded rod or a rope can be used as control members 213. The control member has a first end and a second end, wherein the first end of the control member is fixed to a first stiffener and the second end is fixed to a second stiffener. The attachment between the control member and the stiffener is implemented in such a way that it enables moving the control members with relation to the stiffeners. For example, the stiffener may have openings through which the control member is able to move when the control member length is changed. In this context, changing the control member length means, for example, that the length of the control member, such as a cable or a rope, can be changed, for example by means of an actuator controlling the control member or manually, for example within the limits defined by a certain minimum distance and maximum distance. When a spring is used as a control member in the control arrangement, adjusting the length of the spring or the distance may be determined according to the spring constant of the spring.

Further, the control arrangement has a plurality of lead-throughs 202 provided through the shell of the gas tank 201. The lead-throughs are limited to between the stiffeners 211, 212 on the outer surface of the shell and the inside of the shell, as shown in FIG. 2. The lead-throughs enable leading the control members 213 through the aircraft shell via the lead-throughs 202 in such a way that gas inside the gas tank 201 cannot leak outside the gas tank through the lead-through. The lead-throughs 202 are preferably present in even numbers and they have been arranged in pairs on opposite sides of the gas tank in such a way that both above and below the gas tank, in connection with the stiffeners 211, 212, there is at least one lead-through per each control member 213. In this case, the first end of the control member is fitted to at least one lead-through, and, correspondingly, the second end of the control member is fitted to at least one second lead-through.

Figure 3:
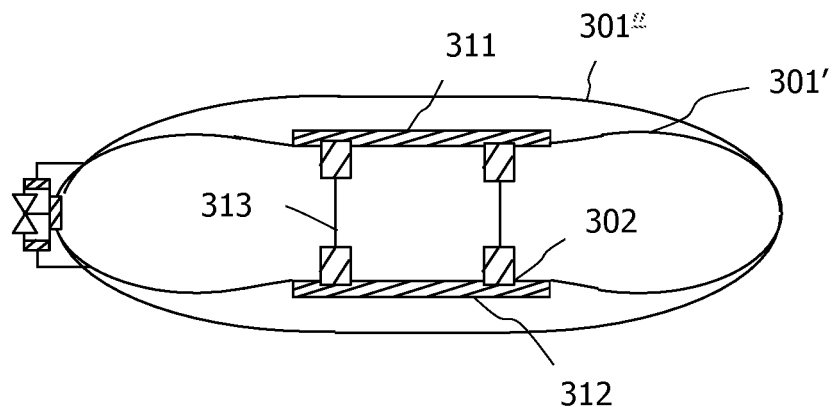
FIG. 3 shows a side view of the cross-section of an aircraft according to an embodiment of the present invention.

Change in the control member length has been presented in more detail in FIGS. 2 and 3. FIG. 3 shows the same aircraft as FIG. 2 in a situation where the distance between the stiffeners 311, 312 has been reduced compared to a situation presented in FIG. 2. In FIG. 2, the stiffeners 211, 212 have been arranged by way of example at a maximum distance from each other, which is for example about 1 meter, whereby the distance between the first stiffener 211 and the second stiffener 212 is at its longest. In FIG. 3, the stiffeners 311, 312 have been arranged by way of example at a minimum distance from each other, which is for example about 0.5 meters, wherein the distance between the first stiffener 311 and the second stiffener 312 is at its shortest, in which case the distance would be adjustable, for example within the range between 0.5 and 1 meters. The minimum and maximum distances of the control members, and thus the adjustment range, within which the distance between the stiffeners 211, 212 can be adjusted, can be changed.

Figure 5:
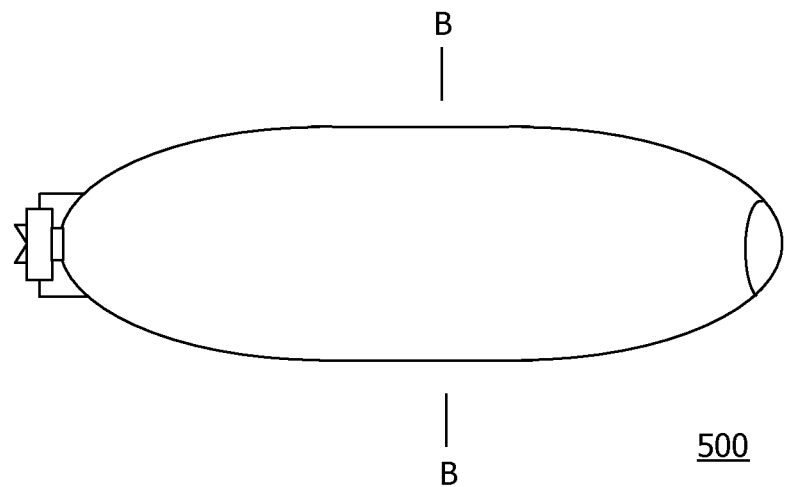
FIG. 5 shows a side view of an aircraft according to an embodiment of the present invention.
Figure 6:
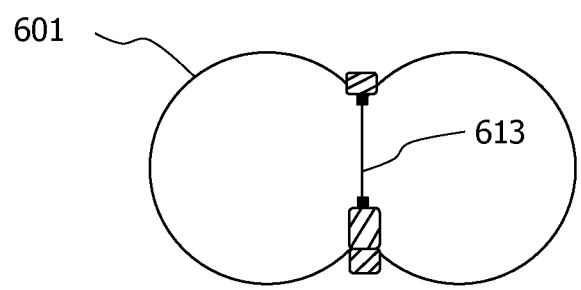
FIG. 6 shows a front view of the cross-section of an aircraft according to an embodiment of the present invention.
Figure 7:
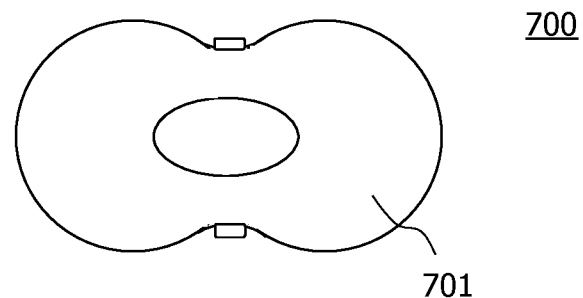
FIG. 7 shows a front view of an aircraft according to an embodiment of the present invention.

Comparing the external shape of the aircraft as shown in FIG. 2 to the external shape of the aircraft shown in FIG. 3, it can be seen that when the first stiffener 311 and the second stiffener 312 limit, at a minimum distance, the aircraft shell in the middle section 301' of the aircraft, the side sections 301 of the aircraft bulge outward. By increasing the length of the control members 313, setting their distance to the maximum distance, in which case the distance between the stiffeners 311, 312 increases, the side sections 301 and the middle section 301' of the gas tank revert to the shape shown in FIG. 2. In FIGS. 5 and 7, the situation shown in FIG. 3 is presented from the outside of the aircraft from different angles of view. FIG. 6 shows a cross-section of the aircraft shown in FIG. 3 when viewed from the front.

Figure 4:
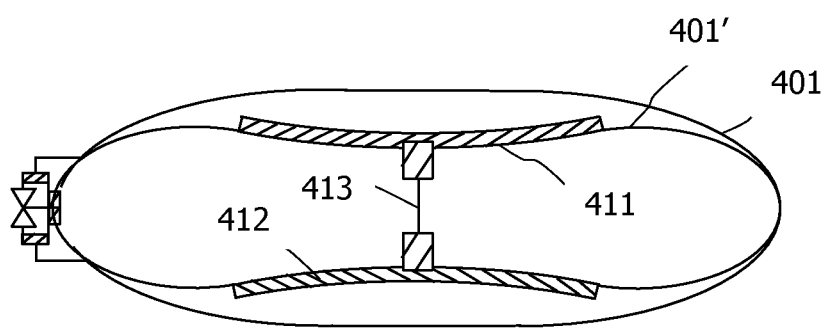
FIG. 4 shows a side view of the cross-section of an aircraft according to an embodiment of the present invention.

FIG. 4 shows a side view of the cross-section of the aircraft according to another embodiment of the present invention. FIG. 4 shows the aircraft control arrangement with flexible stiffeners 411, 412. When the distance between the first stiffener 411 and the second stiffener 412 is reduced via the control member 413, the distance between the stiffeners 411, 412 is reduced, whereby the first stiffener moves closer to the second stiffener. The stiffeners 411, 412 thereby bend in the middle towards the stiffener ends following the external shape of outer surface the aircraft shell.

Instead of a flexible material, a rigid material can be used as a stiffener, for example when a plurality of control members have been provided between the stiffeners, as shown in FIGS. 2 and 3. FIGS. 2 and 3 show two control members of equal length between the first stiffener and the second stiffener, provided at a distance from each other in the lengthwise direction of the stiffeners. There can be more than two control members. In this example, in FIG. 2, it is possible to maintain the distance between the first stiffener 211 and the second stiffener 212 constant throughout the length, as the stiffeners 211, 212 are not able to bend.

The control arrangement further comprises a control unit (not shown in the Figures) configured to communicate with the aircraft motor, propeller, sensors, control members or actuators in order to control them. The control unit may further comprise a microprocessor, a memory, a user interface and software and/or systems enabling remote control of the aircraft or automatic control of the aircraft, for example so-called autopilot software. Automatic control can further comprise any functions enabling the aircraft to maintain its course given in the flight plan and/or carry out navigating functions in the control unit based on received instructions, such as coordinates, flight altitude instructions and/or flying speed instructions.

When controlling the aircraft, the control unit receives the measurement data from the sensors in the aircraft, for example from a pressure sensor, based on which, based on the flight plan, the control unit determines the instructions for adjusting the distance between the stiffeners in the control arrangement. The instructions may be, for example, to increase pressure or to decrease pressure in the gas tank based on a pressure difference, adding gas to the gas tank or removing gas from the gas tank, for example due to a need for change in aerodynamics. The control unit sends the instructions determined based on the data received to the actuators (not shown in the Figures), such as a winch, a motor and/or servo controllers, controlling the length of the control members based on the instructions received from the control unit, whereby the distance between the first stiffener and the second stiffener changes proportionally to the change in the control member length.

It is obvious to a person skilled in the art that the invention is not limited to the solutions described herein but that the inventive idea can be applied in numerous ways within the boundaries set by the claims.

The invention claimed is:

1. An aircraft formed of a shell, an inner surface of the shell defining a space for a gas tank fillable with a lighter-than-air gas, an outer surface of the shell defining an external shape of the aircraft, the external shape of the aircraft being elongated and oval when viewed from the side and round when viewed from the front, the aircraft comprising:
   a control arrangement changing the external shape thereof in order to control the aircraft, the control arrangement consisting essentially of:
      a single elongated upper stiffener provided on the outer surface of the shell on a first side of the gas tank,
      at least one elongated lower stiffener provided on the outer surface of the shell on a second side of the gas tank opposite said single elongated upper stiffener, the single elongated upper stiffener and the at least one elongated lower stiffener being parallel to one another,
      at least two control members with adjustable length each extending directly between the single elongated upper stiffener and the at least one elongated lower stiffener through the shell of the aircraft in a gas tank space defined by the inner surface of the shell, the at least two control members being parallel to one another, the single elongated upper stiffener and the at least one elongated lower stiffener being configured to be movable in a first direction and a second direction opposite to each other via the at least two control members, and
      a plurality of lead-throughs provided between the upper and lower stiffeners on the outer surface of the shell and inside of the shell, the plurality of lead-throughs being configured to lead the at least two control members through the aircraft shell, wherein the at least two control members are of equal length, said at least two control members of equal length being provided at a distance from each other in the lengthwise direction of said stiffeners thereby maintaining the distance between the stiffeners constant throughout the length of the stiffeners.

2. The aircraft according to claim 1, wherein said single elongated upper stiffener and the at least one elongated lower stiffener are separate parts.

3. The aircraft according to claim 1, wherein the length of each of the stiffeners is less than the length of the aircraft.

4. The aircraft according to claim 1, wherein the width of each of the stiffeners is less than the width of the aircraft.

5. The aircraft according to claim 1, wherein the at least two control members are at least one of a cable, a rope, a rail, a rubber band, a threaded rod, and a spring.

6. The aircraft according to claim 1, wherein the control arrangement further comprises a controller configured to communicate with the at least two control members in order to change the length of the at least two control members.

7. The aircraft according to claim 1, wherein the aircraft is unmanned.

8. A method for controlling an aircraft made of a shell, an inner surface of the shell defining a space for a gas tank fillable with a lighter-than-air gas, an outer surface of the shell defining an external shape of the aircraft, the external shape of the aircraft being elongated and oval when viewed from the side and round when viewed from the front, the method comprising:
   providing a single elongated upper stiffener of a control arrangement on the outer surface of the shell of the aircraft on a first side of the gas tank, and at least one elongated lower stiffener of the control arrangement on the outer surface of the shell of the aircraft on a second side of the gas tank opposite said single elongated upper stiffener, the single elongated upper stiffener and the at least one elongated lower stiffener being parallel to one another;
   fitting at least two control members, of the control arrangement, with adjustable length through the shell of the aircraft in a gas tank space defined by the inner surface of the shell such that said at least two control members extend directly between the single elongated upper stiffener and the at least one elongated lower stiffener, the at least two control members being parallel to one another;
   adjusting the distance between the single elongated upper stiffener and the at least one elongated lower stiffener by moving said single elongated upper stiffener and the at least one elongated lower stiffener in a first direction and a second direction opposite to each other;
   providing a plurality of lead-throughs between the upper and lower stiffeners on the outer surface of the shell and inside of the shell;
   leading, by the plurality of lead-throughs, at least two control members through the aircraft shell; and
   configuring said control arrangement lengthwise in the direction of the longitudinal axis of the aircraft along the length of said stiffeners with at least two control members, of the control members, of equal length between said single elongated upper stiffener and said at least one elongated lower stiffener, said at least two control members being provided at a distance from each other in the lengthwise direction of said stiffeners to maintain the distance between the stiffeners constant throughout the length of the stiffeners.

* * * * *